United States Patent
Wang et al.

(10) Patent No.: US 12,122,468 B2
(45) Date of Patent: Oct. 22, 2024

(54) STEPPING DOWN TRAJECTORY PLANNING METHOD, ROBOT USING THE SAME, AND COMPUTER READABLE STORAGE MEDIUM

(71) Applicant: UBTECH ROBOTICS CORP LTD, Shenzhen (CN)

(72) Inventors: Hongge Wang, Shenzhen (CN); Ligang Ge, Shenzhen (CN); Yizhang Liu, Shenzhen (CN); Jie Bai, Shenzhen (CN); Chunyu Chen, Shenzhen (CN); Xingxing Ma, Shenzhen (CN); Jiangchen Zhou, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 464 days.

(21) Appl. No.: 17/562,985

(22) Filed: Dec. 27, 2021

(65) Prior Publication Data

US 2022/0194500 A1 Jun. 23, 2022

Related U.S. Application Data

(63) Continuation of application No. PCT/CN2020/140564, filed on Dec. 29, 2020.

(30) Foreign Application Priority Data

Dec. 22, 2020 (CN) .......................... 202011527349.2

(51) Int. Cl.
*B62D 57/032* (2006.01)
*B25J 9/16* (2006.01)

(52) U.S. Cl.
CPC .......... *B62D 57/032* (2013.01); *B25J 9/1664* (2013.01)

(58) Field of Classification Search
CPC ...... B62D 57/032; B25J 9/1664; B25J 9/1666
See application file for complete search history.

(56) References Cited

FOREIGN PATENT DOCUMENTS

| CN | 105511465 A | 4/2016 |
|---|---|---|
| CN | 110480640 A | 11/2019 |

OTHER PUBLICATIONS

Yisheng Guan, K. Yokoi, A. Kheddar and K. Tanie, "Object Stepping-on/down Feasibility of Humanoid Robots, " 2004 IEEE International Conference on Robotics and Biomimetics, Shenyang, China, 2004, pp. 419-424, doi: 10.1109/ROBIO.2004.1521815. (Year: 2024).*

(Continued)

*Primary Examiner* — Khoi H Tran
*Assistant Examiner* — Trang Dang

(57) ABSTRACT

A stepping down trajectory planning method as well as a robot using the same and a computer readable storage medium are provided. The method includes: dividing a stepping down process of the robot into a plurality of planned stages; adjusting a start position of a swing leg of the robot according to an ankle-to-heel distance, where the ankle-to-heel distance is a horizontal distance between an ankle joint of the swing leg of the robot and a heel of the swing leg of the robot; determining an initial state and an end state of the swing leg in each of the planned stages according to the start position; and obtaining a planned trajectory of the swing leg by performing a curve fitting on the swing leg in each of the planned stages the initial state and the end state.

20 Claims, 7 Drawing Sheets

(56) References Cited

OTHER PUBLICATIONS

Ching-Long Shih, "Ascending and descending stairs for a biped robot," in IEEE Transactions on Systems, Man, and Cybernetics—Part A: Systems and Humans, vol. 29, No. 3, pp. 255-268, May 1999, doi: 10.1109/3468.759271. (Year: 2024).*
Kwon, O., Jeon, K.S. & Park, J. H. Optimal trajectory generation for biped robots walking up-and-down stairs. J Mech Sci Technol 20, 612-620 (2006). https://doi.org/10.1007/BF02915978 (Year: 2024).*
Kim, E., Kim, M., Kim, JW. (2009). Optimal Trajectory Generation for Walking Up and Down a Staircase with a Biped Robot Using Genetic Algorithm (GA). In: Kim, JH., et al. Advances in Robotics. FIRA 2009. Lecture Notes in Computer Science, vol. 5744. Springer, Berlin, Heidelberg. (Year: 2024).*
ISR for PCT/CN2020/140564.
Written opinions of ISA for PCT/CN2020/140564.

* cited by examiner

STEPPING DOWN TRAJECTORY PLANNING METHOD, ROBOT USING THE SAME, AND COMPUTER READABLE STORAGE MEDIUM

CROSS REFERENCE TO RELATED APPLICATIONS

The present application is a continuation-application of International Application PCT/CN2020/140564, with an international filing date of Dec. 29, 2020, which claims foreign priority of Chinese Patent Application No. 202011527349.2, filed on Dec. 22, 2020 in the State Intellectual Property Office of China, the contents of all of which are hereby incorporated by reference.

BACKGROUND

1. Technical Field

The present disclosure relates to robot technology, and particularly to stepping down trajectory planning method as well as a robot using the same and a computer readable storage medium.

2. Description of Related Art

Compared with wheeled and crawler robots, an advantage of biped robots is that they can adapt to the living environment of humans so as to, for example, walking on uneven ground and stepping up and down. However, the existing trajectory plannings are usually for the scene of walking on flat ground, which has difficulty to adapt to complicated scene of robot such as stepping up and down.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 8:
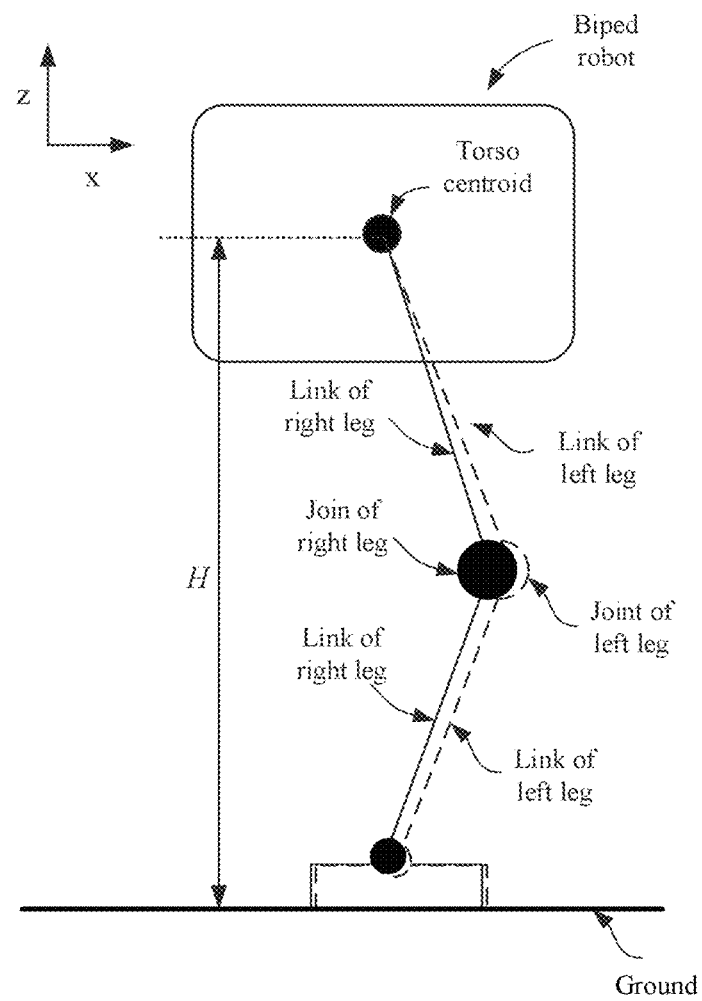
FIG. 8 is a structure schematic diagram of a biped robot.

In the actual application of controlling a legged robot, for example, as shown in FIG. 8, a biped robot having two legs each including links connected by joints to go down steps, whether the trajectory planning of the feet and the torso centroid (center of mass) is reasonable is essential. Firstly, the planning of the swing leg (i.e., one of the legs that leaving the ground to swing to the next step) during lifting leg should avoid crossing the envelope plane of the step to prevent the robot from tripping over the steps when lifting. Secondly, the times for the horizontal movement and the vertical movement of the swing leg should be reasonably allocated, because large acceleration and deceleration in any direction will lead to instability of the robot. Finally, the trajectory of Center of Mass (COM) for the robot will directly affect the stability of the robot when it goes down steps.

In the process of going down steps, the main impact to the robot is the planning of the swing leg in the forward direction of the robot (i.e., the direction of the robot to move) and the vertical direction of the robot, while the planning in the lateral direction of the robot can be set to fixed value.

Figure 1:
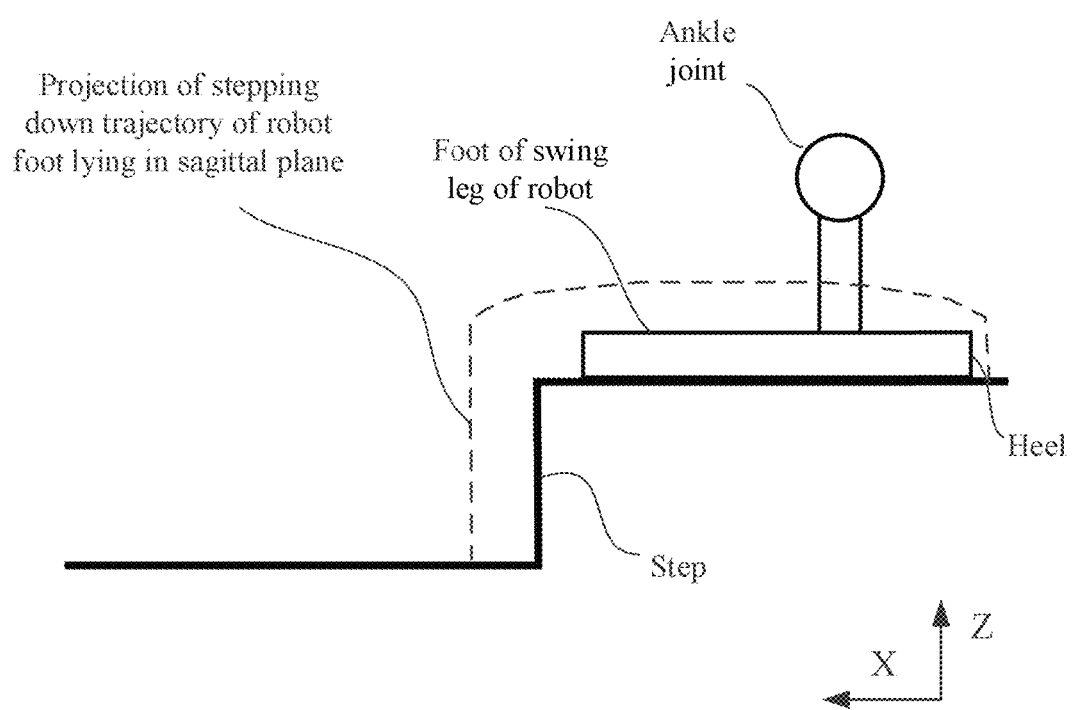
FIG. 1 is a schematic diagram of the projection of a foot trajectory planned for the stepping down of a robot on a sagittal plane according to an embodiment of the present disclosure.

Therefore, in the following descriptions of the embodiments of the present disclosure, the optimal trajectory problem is reduced to 2-DoF system, including the forward direction and vertical direction. Referring to FIG. 1, the projection of the stepping down trajectory of a robot foot F lying in a sagittal plane is shown in dashed line. In which, the x direction is the forward direction of the robot, and the z direction is the upward direction. The foot F trajectory planning is to realize: (a) vertically lifting the swing leg at the beginning; (b) swinging the swing leg forward after leaving the ground a certain distance; (c) putting down the swing leg after reaching a certain height, while the trajectory in the z-direction does not contact the horizontal surface of the step S before the heel H of the foot F of the swing leg swings to the vertical surface of the step; and (d) stopping the horizontal movement of the swing leg when the swing leg is about to reach the ground and putting down the swing leg vertically.

Figure 2:
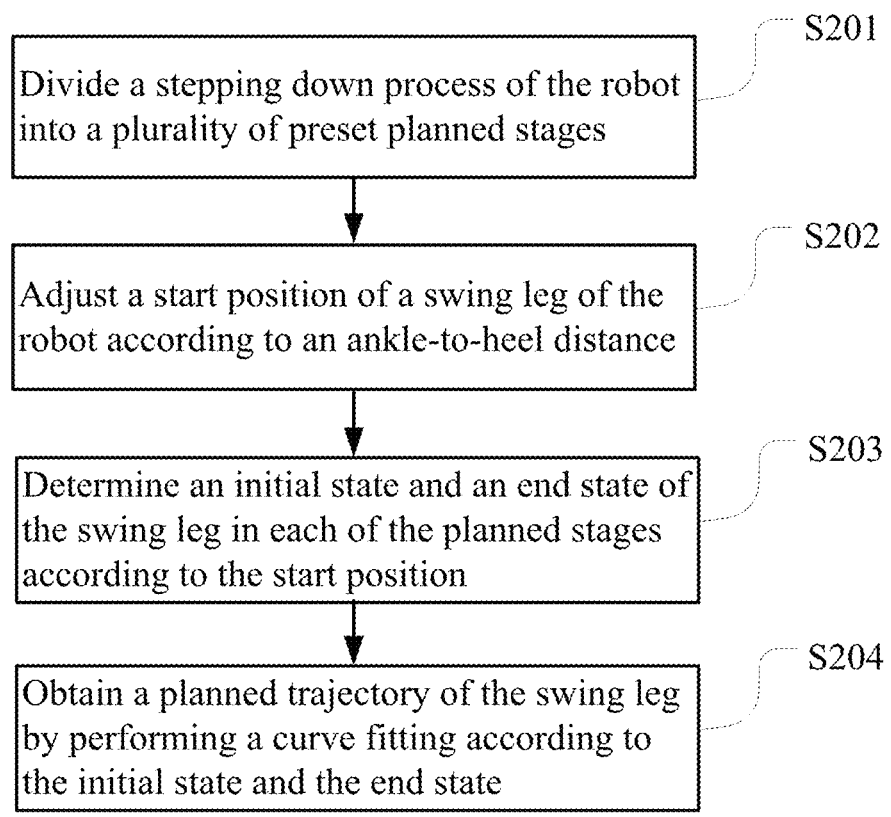
FIG. 2 is a flow chart of a robot stepping down trajectory planning method according to an embodiment of the present disclosure.

FIG. 2 is a flow chart of a robot stepping down trajectory planning method according to an embodiment of the present disclosure. In one embodiment, the stepping down trajectory planning method is a computer-implemented method executable for a processor, which may be applied to the above-mentioned legged robot. Each leg of the robot may include a thigh, a knee, a shank, and a foot. The method may be implemented through a robot stepping down trajectory planning apparatus shown in FIG. 6 or a robot shown in FIG. 7. As shown in FIG. 2, the method may include the following steps.

S201: dividing a stepping down process of the robot into a plurality of planned stages.

Figure 4:
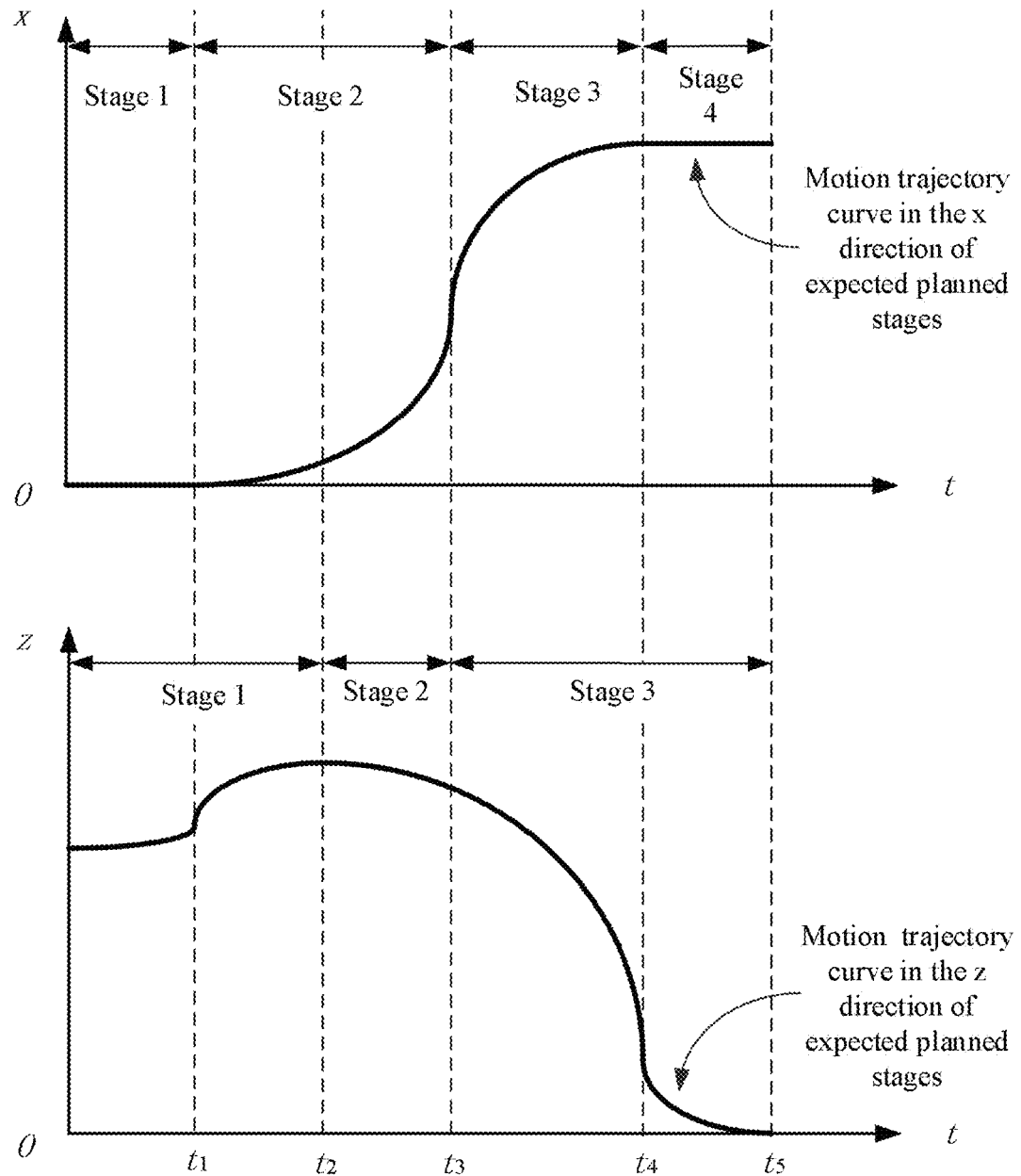
FIG. 4 is a schematic diagram of trajectory curves of expected planned stages according to an embodiment of the present disclosure.

In this embodiment, the foot trajectory of the robot is planned in the x direction and the z direction, respectively. FIG. 4 is a schematic diagram of trajectory curves of expected planned stages according to an embodiment of the present disclosure. As shown in FIG. 4, each of $t_1$, $t_2$, $t_3$, $t_4$ and $t_5$ are the times corresponding to each key point selected from the trajectory curve, where $t_5=T$, T is the swing cycle of the swinging leg. These key points divide the entire process of going down steps into a plurality of planned stages. From time 0 to $t_1$, it does not move in the x direction, and starts to lift in the z direction. At time $t_1$, it starts to swing forward in the x direction. At time $t_2$, it reaches the highest point in the z direction. During time $t_2$-$t_3$, it starts to fall in the z direction. At time $t_3$, it drops to the height of the step in the z direction while crosses the vertical surface of the step in the x direction. At time $t_4$, it stops moving in the x-direction. During time $t_4$-$t_5$, it keeps the horizontal position unchanged in the x-direction, and slowly falls to height of the step in the z direction.

S202: adjusting a start position of a swing leg of the robot according to an ankle-to-heel distance.

In order to prevent the heel of the swing leg of the robot from hitting the step, the heel of the swing leg has to cross the vertical surface of a step before its height drops below the horizontal surface of the step. The closer the heel of the swing leg to the vertical surface of the step, the sooner the heel can pass through the vertical surface of the step, and the sooner the height of the swing leg can drop below the horizontal surface of the step, and there will have more time remained for the swing leg to fall vertically, which is beneficial to reduce the maximum speed and the maximum acceleration of vertical movements and therefore improves the stability of the robot.

Figure 3:
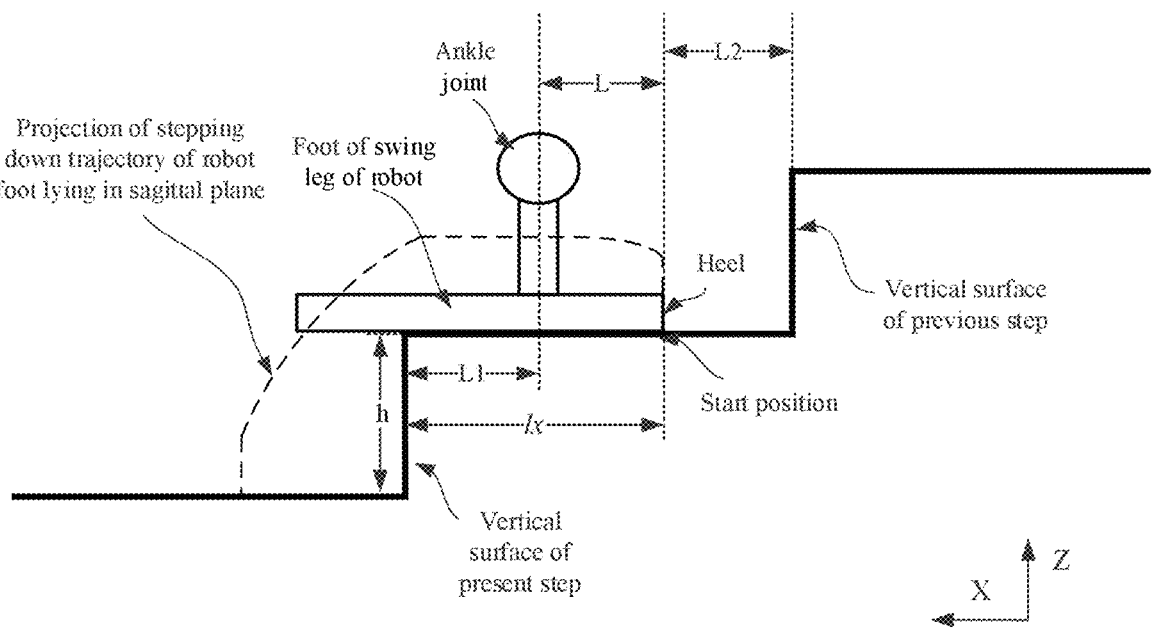
FIG. 3 is a schematic diagram of adjusting a start position of the swing leg of the robot according to an embodiment of the present disclosure.

FIG. 3 is a schematic diagram of adjusting a start position of the swing leg of the robot according to an embodiment of the present disclosure. Therefore, as shown in FIG. 3, in this embodiment, the start position of the swing leg may be adjusted in advance, so that the heel of the swing leg is closer to the vertical surface of the step, and the front part of the foot is exposed from the vertical surface of the step to enhance the stability of the robot going down the steps. Hence, the start position may be adjusted so that the horizontal distance L1 between the ankle joint of the swing leg and the vertical surface of the step (i.e., the present step) is not smaller than (i.e., larger than or equal to) the ankle-to-heel distance L, and the distance L2 between the heel and the vertical surface of the previous step is not smaller than (i.e., larger than or equal to) the ankle-to-heel distance L. In which, the ankle-to-heel distance L is the horizontal distance between the ankle joint and the heel of the robot. However, in order to guarantee that there has a sufficient support area, the front part of the foot should not exceed the vertical surface too much. In this embodiment, the start position of the swing leg may be adjusted in the following manner to achieve the best balance, that is, making the horizontal distance L1 between the ankle joint of the swing leg and the vertical surface of the step equal to the ankle-to-heel distance L. In other embodiments, the horizontal distance L1 between the ankle joint of the swing leg and the vertical surface of the step may be larger than the ankle-to-heel distance L as long as the sole of the foot can be supported steadily.

S203: determining an initial state (including an initial position and an initial speed) and an end state (including an end position and an end speed) of the swing leg in each of the planned stages according to the start position In this embodiment, in the first stage of an x direction ($0 \le t \le t_1$), the initial position is set to 0, the initial speed is set to 0, the end position is set to 0, and the end speed is set to 0, that is, $x_0=x_1=0$ and $vx_0=vx_1=0$.

In the second stage of the x direction ($t_1 \le t \le t_3$), the initial position is set to 0, the initial speed is set to 0 the end position is set to lx, and the end speed is set to a preset first speed, that is, $x_1=0$, $x_3=lx$, $vx_1=0$, and $vx_3=v_1$, where lx is a horizontal distance between a heel of the swing leg and the vertical surface of the step.

In the third stage of the x direction ($t_3 \le t \le t_4$), the initial position is set to lx, the initial speed is set to the first speed, the end position is set to 1, and the end speed is set to 0, that is, $x_3=lx$, $x_4=l$, $vx_3=v_1$, and $vx=0$; where l is the step length of the robot.

In the fourth stage of the x direction ($t_4 \le t \le t_5$), the initial position is set to 1, the initial speed is set to 0, the end position is set to 1, and the end speed is set to 0, that is, $x_4=x_5=l$ and $vx_4=vx_5=0$.

Then, the key points in the x direction include: $(0,x_0,vx_0)$, $(t_1,x_1,vx_1)$, $(t_3,x_3,vx_3)$, $(t_4,x_4,vx_4)$, and $(t_5,x_5,vx_5)$.

In the first stage of a z direction ($0 \le t \le t_2$), the initial position is set to h, setting the initial speed to 0, the end position is set to $h+\Delta h_1$, and the end speed is set to 0, that is, $z_0=h$, $z_2=h+\Delta h_1$, and $vz_0=vz_2=0$, where the z direction is the upward direction of the robot, h is the height of the step, $\Delta h_1$ is a preset first height and $\Delta h_1>0$;

In the second stage of the z direction ($t_2 \le t \le t_3$), the initial position is set to $h+\Delta h_1$, the initial speed is set to 0, the end position is set to $h+\Delta h_2$, and the end speed is set to a preset second speed, that is, $z_2=h+\Delta$, $z_3=h+\Delta h_2$, $vz_2=0$, and $vz_3=v_2$, where $\Delta h_2$ is a preset second height and $\Delta h_2>0$, to guarantee that the height of the swing leg is kept above the step before it reaches the vertical surface of the step. As an example, $\Delta h_2$ can be set as 0.01 m. $v_2$ is the second speed. In this embodiment, the second speed may be calculated through an equation of $v_2=(h+\Delta h_1)/(t_5-t_2)$. In this manner, the second speed is set as the average speed at which the swing leg falls so as to reduce the acceleration and deceleration during the swinging of the swinging leg, thereby guaranteeing the smoothness of the trajectory curve.

In the third stage of the z direction ($t_3 \le t \le t_5$), the initial position is set to $h+\Delta h_2$, the initial speed is set to the second speed, the end position is set to 0, and the end speed is set to 0 that is, $z_3 = h+\Delta h_2$, $vz_3 = v_2$, $z_5 = 0$, and $vz_5 = 0$.

Then, the key points in the z direction include: $(0, z_0, vz_0)$, $(t_2, z_2, vz_2)$, $(t_3, z_3, vz_3)$, and $(t_5, z_5, vz_5)$.

It should be noted that, in the forgoing process, all of the positions in the x direction take the start position as a base point, that is, the value of the start position is set to 0, and the values of other positions are the horizontal distance between the position and the start position. All of the positions in the z direction take the horizontal surface of the next step as the base point, that is, the value of the horizontal surface of the next step is set to 0, and the values of other positions are the vertical distance between the position and the horizontal surface of the next step.

S204: obtaining a planned trajectory of the swing leg by performing a curve fitting according to the initial state and the end state.

In the planning process, for each planned stage, a smooth motion curve from the initial state to the end state may be determined by curve fitting. This motion curve may include, but is not limited to, cubic polynomial curve, S-curve, cubic spline curve, cubic Hermite curve, Bezier curve, and the like.

Taking the cubic polynomial curve as an example, the curve fitting may be performed in the x direction according to an equation of:

$$x(t) = f(x_b, x_f, v_b, v_f, t_b, t_f, t) = a_0 + a_1(t-t_b) + a_2(t-t_b)^2 + a_3(t-t_b)^3;$$

where, $t_b$ is the initial time of the planned stage, $x_b$ is the initial position, $v_b$ is the initial speed, $t_f$ is the end time of the planned stage, $x_f$ is the end position, $v_f$ of is the end speed, t is the time, $f$ is a cubic polynomial function, x(t) is the planned trajectory curve in the x direction, and $a_0$, $a_1$, $a_2$, and $a_3$ are coefficients of a cubic polynomial that meet equations of:

$$a_0 = x_b;$$

$$a_1 = v_f;$$

$$a_2 = \frac{3}{(t_f - t_b)^2}(x_f - x_b) - \frac{1}{(t_f - t_b)^2}(2v_b + v_f); \text{ and}$$

$$a_3 = -\frac{2}{(t_f - t_b)^3}(x_f - x_b) + \frac{1}{(t_f - t_b)^2}(v_b + v_f).$$

The resulting motion curve x(t) in the x direction is as the upper part of FIG. 4 that:
in the first stage of the x direction ($0 \le t \le t_1$), x(t)=0;
in the second stage of the x direction ($t_1 \le t \le t_3$), $x(t) = f(x_1, x_3, vx_1, vx_3, t_1, t_3, t)$;
in the third stage of the x direction ($t_3 \le t \le t_4$), $x(t) = f(x_3, x_4, vx_3, vx_4, t_3, t_4, t)$;
in the fourth stage in the x direction ($t_4 \le t \le t_5$), $x(t) = f(x_4, x_5, vx_4, vx_5, t_4, t_5, t)$;

Similarly, the resulting motion curve z(t) in the z direction is as the lower part of FIG. 4:
in the first stage of the z direction ($0 \le t \le t_2$), $z(t) = f(z_0, z_2, vz_0, vz_2, 0, t_2, t)$;
in the second stage of the z direction ($t_2 \le t \le t_3$) $z(t) = f(z_2, z_3, vz_2, vz_3, t_2, t_3, t)$; and
in the third stage in the z direction ($t_3 \le t \le t_5$), $z(t) = f(z_3, z_5, vz_3, vz_5, t_3, t_5, t)$.

In the planning of the swinging leg, the number of key points should be minimized as much as possible, because the more key points specified, the easier it is to destroy the smoothness of the trajectory, and the more likely it is to cause frequent acceleration and deceleration of the swinging leg, which will affect the stability of the robot. In other embodiments, the above-mentioned selected key points may be further simplified.

As an example, in the z direction, it can select only the key points $(0, z_0, vz_0)$, $(t_2, z_2, vz_2)$ and $(t_5, z_5, vz_5)$ while delete the key point $(t_5, z_5, vz_5)$. In this manner, the key points of the footing stage in the z direction are only the key point $(t_2, z_2, vz_2)$ at the beginning of the footing and the key point $(t_5, z_5, vz_5)$ at the end of the footing. In this case, there will be only two stages in the z-direction. In which, the first stage in the z direction will still consistent with the that in the x direction, while in the second stage in the z-direction, the initial position will be set to $h+\Delta h_1$, the initial speed will be set to 0, the end position will be set to 0, and the end speed will be set to 0. The subsequent curve fitting is similar to the that in the x direction, and will not be repeated herein.

In order to avoid collisions with the step, the key point $(t_3, x_3, vx_3)$ in the x direction needs to be adjusted accordingly while reducing the key points in the z direction. As an example, $t_3$ may be set to $t_h$, and $x_3$ may be set to $lx+\Delta x$, where $t_h$ is the time when the swing leg drops to the height of the horizontal surface of the current step, $\Delta x$ is the preset horizontal distance and $\Delta x > 0$, so as to guarantee that the swing leg has crossed the vertical surface of the step before dropping to the horizontal surface of the step, thereby guaranteeing that the swing leg will not hit the step. In this embodiment, $\Delta X$ may be set to 0.01 meters. In this case, it is necessary to replace both the above-mentioned end position and initial position of the second stage in the x direction with $lx+\Delta X$, while the rest part is still consistent with that in the x direction, and will not be repeated herein.

The value of $t_h$ may be determined by connecting the fitting curve which connects $(t_2, z_2, vz_2)$ and $(t_5, z_5, vz_5)$. It is assumed that the fitting curve connecting these two points that is obtained by the forgoing curve fitting calculation is:

$$z(t) = at^3 + bt^2 + ct + d;$$

where, a, b, c and d are the coefficients of the fitting curve.

Then, it may determine the value of $t_h$ by solving an equation of:

$$at^3 + bt^2 + ct + d = h;$$

or solving an equation of:

$$at^3 + bt^2 + ct + d' = 0;$$

where, d'=d−h.

By using the Sheng Jin formula to solve the equation, three solutions can be solved, and the time when the swing leg drops to the height of the horizontal surface of the current step should be between $t_2$ and $t_5$, and one of the three solutions that is between $t_2$ and $t_5$ may be selected to use as $t_h$.

When the robot goes down the steps, the planning of the centroid of its torso is also a key part. If the planning of the centroid is unreasonable, it will cause the movement of the legs to exceed the working space and directly affect the stability of the robot. In order to guarantee that the swing leg of the robot does not exceed the working space, the centroid should also be dropped when the swing leg is dropped. However, sometimes the speed of the swing leg will be fast when it drops, and if the centroid drops too fast, it will directly affect the stability of the robot.

Figure 5:
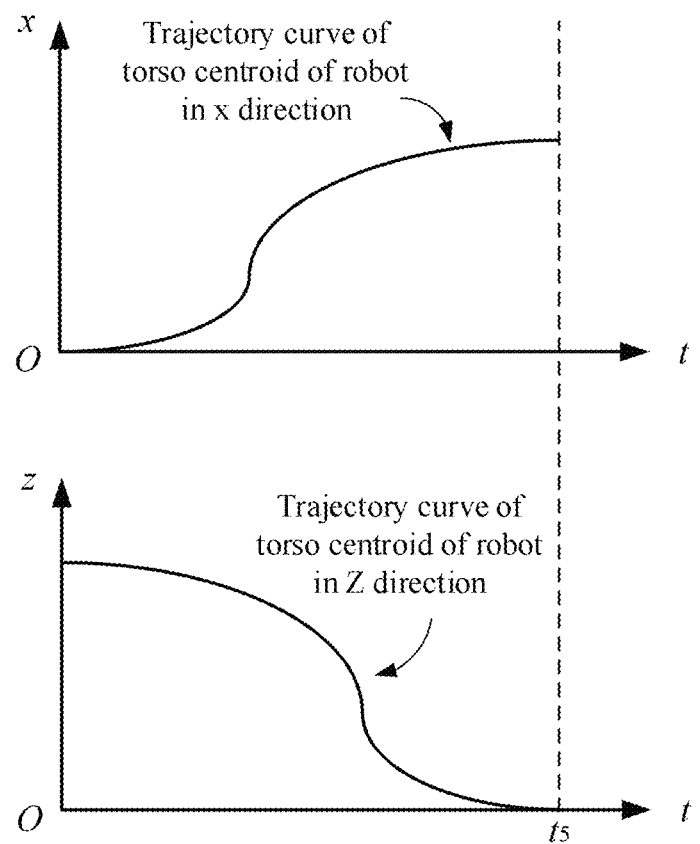
FIG. 5 is a schematic diagram of trajectory curves of the centroid of the torso of the robot according to an embodiment of the present disclosure.

FIG. 5 is a schematic diagram of trajectory curves of the centroid of the torso of the robot according to an embodiment of the present disclosure. As shown in FIG. 5, in this embodiment, the initial state and the end state of the centroid of the robot during the stepping down process may be determined first.

In this embodiment, in the x direction, the initial position is set to 0, the initial speed is set to 0, the end position is set to 0, and the end speed is set to 0.

In the z direction, the initial position is set to h+H, the initial speed is set to 0, the end position is set to H, and the end speed is set to 0. In which, H is the preset height of the centroid, which may generally be set as the height of the centroid of the robot to the ground when the robot is standing normally.

Then, the curve fitting may be performed according to the initial state and the end state, so as to obtain the planned trajectory of the centroid of the robot. The specific curve fitting process can be referred to that of the the swinging leg, which will not be repeated herein.

In summary, in this embodiment, by dividing a stepping down process of the robot into a plurality of planned stages; adjusting a start position of a swing leg of the robot according to an ankle-to-heel distance, where the ankle-to-heel distance is a horizontal distance between an ankle joint of the swing leg of the robot and a heel of the swing leg of the robot; determining an initial state and an end state of the swing leg in each of the planned stages according to the start position; and obtaining a planned trajectory of the swing leg by performing a curve fitting according to the initial state and the end state, a staged trajectory planning for the stepping down process of the robot can be carried out, which greatly improves the stability of the robot when going down steps.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 6:
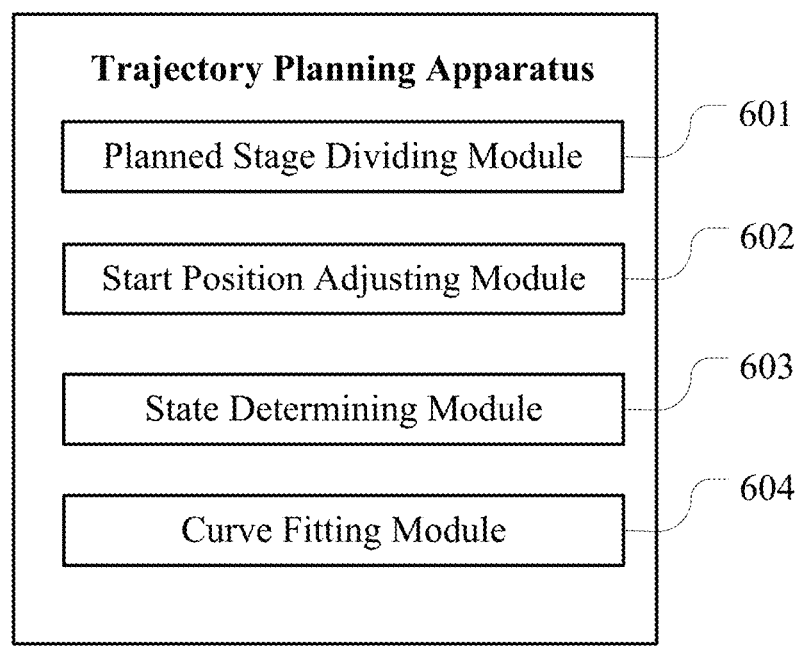
FIG. 6 is a schematic block diagram of the structural of a robot stepping down trajectory planning apparatus according to an embodiment of the present disclosure.

FIG. 6 is a schematic block diagram of the structural of a robot stepping down trajectory planning apparatus according to an embodiment of the present disclosure. As shown in FIG. 6, a stepping down trajectory planning apparatus for a robot that corresponds to the robot stepping down trajectory planning method described in the above-mentioned embodiment is provided.

In this embodiment, the stepping down trajectory planning apparatus for a robot may include:
- a planned stage dividing module 601 configured to divide a stepping down process of the robot into a plurality of planned stages;
- a start position adjusting module 602 configured to adjust a start position of a swing leg of the robot according to an ankle-to-heel distance, where the ankle-to-heel distance is a horizontal distance between an ankle joint of the swing leg of the robot and a heel of the swing leg of the robot;
- a state determining module 603 configured to determine an initial state and an end state of the swing leg in each of the planned stages according to the start position; and
- a curve fitting module 604 configured to obtain a planned trajectory of the swing leg by performing a curve fitting on the swing leg in each of the planned stages the initial state and the end state.

Furthermore, the start position adjusting module 602 may be configured to adjust the start position so that a horizontal distance between the ankle joint of the swing leg and a vertical step surface is not smaller than the ankle-to-heel distance Furthermore, the state determining module 603 may include:
- a first state determining unit configured to, in the first stage of an x direction, set an initial position in the initial state to 0, set an initial speed in the initial state to 0, set an ending position in the end state to 0, and set an ending speed in the end state to 0, where the x direction is a forward direction of the robot;
- a second state determining unit configured to, in the second stage of the x direction, set the initial position to 0, set the initial speed to 0, set the end position to lx, and set the end speed to a preset first speed, where lx is a horizontal distance between a heel of the swing leg and a vertical step surface;
- a third state determining unit configured to, in the third stage of the x direction, set the initial position to lx, set the initial speed to the first speed, set the end position to 1, and set the end speed to 0, where l is a step length of the robot; and
- a fourth state determining unit configured to, in the fourth stage of the x direction, sett the initial position to 1, set the initial speed to 0, set the end position to 1, and set the end speed to 0.

Furthermore, the state determining module 603 may further include:
- a fifth state determining unit configured to, in a first stage of a z direction, set the initial position to h, set the initial speed to 0, set the end position to h+$\Delta h_1$, and set the end speed to 0, where the z direction is an upward direction of the robot, h is a step height, $\Delta h_1$ is a preset first height and $\Delta h_1 > 0$;
- a sixth state determining unit configured to, in a second stage of the z direction, set the initial position to h+$\Delta h_1$, set the initial speed to 0, set the end position to h+$\Delta h_2$, and set the end speed to a preset second speed, where $\Delta h_2$ is a preset second height and $\Delta h_2 > 0$; and
- a seventh state determining unit configured to, in a third stage of the z direction, set the initial position to h+$\Delta h_2$, set the initial speed to the second speed, set the end position to 0, and setting the end speed to 0.

Furthermore, the curve fitting module 604 may include:
a curve fitting unit configured to perform the curve fitting in the x direction according to an equation of:

$$x(t)=f(x_b,x_f,v_b,v_f,t_b,t_f,t)=a_0+a_1(t-t_b)+a_2(t-t_b)^2+a_3(t-t_b)^3;$$

where, $t_b$ is the initial time of the planned stage, $x_b$ is the initial position, $v_b$ is the initial speed, $t_f$ is the end time of the planned stage, $x_f$ is the end position, $v_f$ is the end speed, t is the time, $f$ is a cubic polynomial function, x(t) is the planned trajectory curve in the x direction, and $a_0$, $a_1$, $a_2$, and $a_3$ are coefficients of a cubic polynomial.

Furthermore, the curve fitting module 604 may further include:
a coefficient determining unit configured to calculate the coefficients of the cubic polynomial according to equations of:

$$a_0 = x_b;$$

$$a_1 = v_f;$$

$$a_2 = \frac{3}{(t_f - t_b)^2}(x_f - x_b) - \frac{1}{(t_f - t_b)^2}(2v_b + v_f); \text{ and}$$

$$a_3 = -\frac{2}{(t_f - t_b)^3}(x_f - x_b) + \frac{1}{(t_f - t_b)^2}(v_b + v_f).$$

Those skilled in the art can clearly understand that, for the convenience and conciseness of the description, the specific working processes of the above-mentioned apparatus, modules and units can refer to the corresponding processes in the foregoing method embodiments, which will not be repeated herein.

Figure 7:
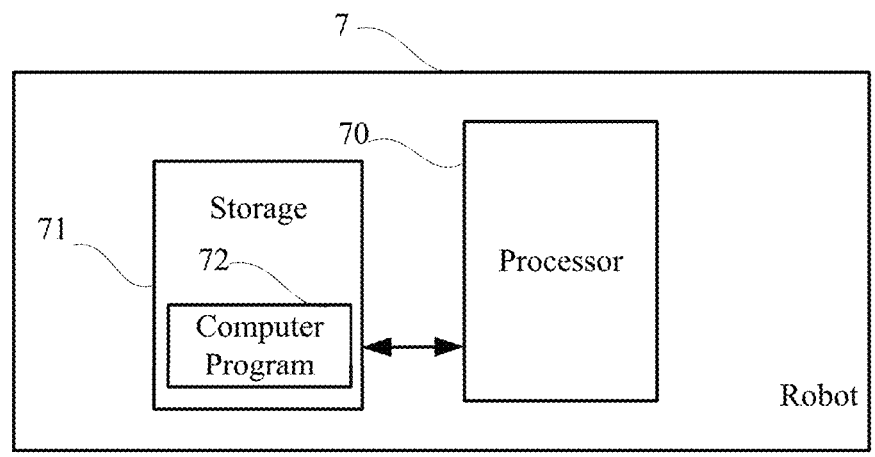
FIG. 7 is a schematic block diagram of a robot according to an embodiment of the present disclosure.

FIG. 7 is a schematic block diagram of a robot according to an embodiment of the present disclosure. For ease of description, only the parts related to this embodiment are shown.

As shown in FIG. 7, in this embodiment, a robot 7 is provided. The robot 7 includes a processor 70, a storage 71, and a computer program 72 stored in the storage 71 and executable on the processor 70. When executing (instructions in) the computer program 72, the processor 70 implements the steps in the above-mentioned embodiments of the stepping down trajectory planning method for a robot, for example, steps S201-S204 shown in FIG. 2. Alternatively, when the processor 70 executes (instructions in) the computer program 72, the functions of each module/unit in the above-mentioned device embodiments, for example, the functions of the modules 601-604 shown in FIG. 6 are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7.

It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented stepping down trajectory planning method for a robot, comprising:
   dividing a stepping down process of the robot into a plurality of planned stages;
   adjusting a start position of a swing leg of the robot according to an ankle-to-heel distance so that a distance between a heel of the swing leg and a vertical surface of a previous step minus the ankle-to-heel distance is greater than or equal to 0, wherein the ankle-to-heel distance is a horizontal distance between an ankle joint of the swing leg of the robot and the heel of the swing leg of the robot;
   determining an initial state and an end state of the swing leg in each of the planned stages according to the start position; and
   obtaining a planned trajectory of the swing leg by performing a curve fitting according to the initial state and the end state, and controlling the robot to walk according to the planned trajectory of the swing leg.

2. The method of claim 1, wherein the adjusting the start position of the swing leg of the robot according to the ankle-to-heel distance comprises:
   adjusting the start position so that a horizontal distance between the ankle joint of the swing leg and a vertical surface of a present step minus the ankle-to-heel distance is greater than or equal to 0.

3. The method of claim 1, wherein the determining the initial state and the end state of the swing leg in each of the planned stages according to the start position comprises:
   determining the initial state and the end state of the swing leg in each of the planned stages in an x direction and a z direction according to the start position, wherein the x direction is a forward direction of the robot, and the z direction is an upward direction of the robot.

4. The method of claim 3, wherein the determining the initial state and the end state of the swing leg in each of the planned stages according to the start position comprises:
   in a first stage of the x direction, setting an initial position in the initial state to 0, setting an initial speed in the initial state to 0, setting an ending position in the end state to 0, and setting an ending speed in the end state to 0;
   in a second stage of the x direction, setting the initial position to 0, setting the initial speed to 0, setting the end position to lx, and setting the end speed to a preset first speed, wherein lx is a horizontal distance between the heel of the swing leg and a vertical surface of a present step;
   in a third stage of the x direction, setting the initial position to lx, setting the initial speed to the preset first speed, setting the end position to 1, and setting the end speed to 0, wherein l is a step length of the robot;
   in a fourth stage of the x direction, setting the initial position to 1, setting the initial speed to 0, setting the end position to 1, and setting the end speed to 0;
   in a first stage of the z direction, setting the initial position to h, setting the initial speed to 0, setting the end position to $h+\Delta h_1$, and setting the end speed to 0, wherein h is a step height, $\Delta h_1$ is a preset first height and $\Delta h_1 > 0$;
   in a second stage of the z direction, setting the initial position to $h+\Delta h_1$, setting the initial speed to 0, setting the end position to $h+\Delta h_2$, and setting the end speed to a preset second speed, wherein $\Delta h_2$ is a preset second height and $\Delta h_2 > 0$; and
   in a third stage of the z direction, setting the initial position to $h+\Delta h_2$, setting the initial speed to the preset second speed, setting the end position to 0, and setting the end speed to 0.

5. The method of claim 3, wherein the determining the initial state and the end state of the swing leg in each of the planned stages according to the start position comprises:
   in a first stage of the x direction, setting an initial position in the initial state to 0, setting an initial speed in the initial state to 0, setting an ending position in the end state to 0, and setting an ending speed in the end state to 0;
   in a second stage of the x direction, setting the initial position to 0, setting the initial speed to 0, setting the end position to $lx+\Delta x$, and setting the end speed to a preset first speed, wherein lx is a horizontal distance between the heel of the swing leg and a vertical step surface a vertical surface of a present step, and $\Delta x$ is a preset horizontal distance;
   in a third stage of the x direction, setting the initial position to $lx+\Delta x$, setting the initial speed to the preset first speed, setting the end position to 1, and setting the end speed to 0, wherein l is a step length of the robot;
   in a fourth stage of the x direction, setting the initial position to 1, setting the initial speed to 0, setting the end position to 1, and setting the end speed to 0;

in a first stage of the z direction, setting the initial position to h, setting the initial speed to 0, setting the end position to h+Δh$_1$, and setting the end speed to 0, wherein h is a step height, Δh$_1$ is a preset first height and Δh$_1$>0; and in a second stage of the z direction, setting the initial position to h+Δh$_1$, setting the initial speed to 0, setting the end position to 0, and setting the end speed to 0.

6. The method of claim 1, further comprising:

determining the initial state and the end state of a centroid of the robot during the stepping down process; and obtaining a planned trajectory of the centroid by performing a curve fitting according to the initial state and the end state.

7. The method of claim 6, wherein the determining the initial state and the end state of the centroid of the robot during the stepping down process comprises:

in an x direction, setting an initial position to 0, setting an initial speed to 0, setting an end position to 0, and setting an end speed to 0, wherein the x direction is a forward direction of the robot; and in a z direction, setting the initial position to h+H, setting the initial speed to 0, setting the end position to H, and setting the end speed to 0; wherein h is a step height, His a preset height of the centroid, and the z direction is an upward direction of the robot.

8. The method of claim 1, wherein the performing the curve fitting according to the initial state and the end state comprises:

performing the curve fitting according to an equation of:

$$x(t)=f(x_b,x_f,v_b,v_f,t_b,t_f,t)=a_0+a_1(t-t_b)+a_2(t-t_b)^2+a_3(t-t_b)^3;$$

where, $t_b$ is the initial time, $x_b$ is the initial position, $v_b$ is the initial speed, $t_f$ is the end time, $x_f$ is the end position, $v_f$ is the end speed, t is the time, $f$ is a cubic polynomial function, x(t) is the planned trajectory curve in the x direction, and $a_0$, $a_1$, $a_2$, and $a_3$ are coefficients of a cubic polynomial.

9. The method of claim 8, wherein each of the coefficients of the cubic polynomial are set by:

calculating the coefficients of the cubic polynomial according to equations of:

$$a_0 = x_b;$$

$$a_1 = v_f;$$

$$a_2 = \frac{3}{(t_f-t_b)^2}(x_f-x_b) - \frac{1}{(t_f-t_b)^2}(2v_b+v_f); \text{ and}$$

$$a_3 = -\frac{2}{(t_f-t_b)^3}(x_f-x_b) + \frac{1}{(t_f-t_b)^2}(v_b+v_f).$$

10. A robot, comprising:

a processor;

a memory coupled to the processor; and one or more computer programs stored in the memory and executable on the processor;

wherein, the one or more computer programs comprise:

instructions for dividing a stepping down process of the robot into a plurality of planned stages;

adjusting a start position of a swing leg of the robot according to an ankle-to-heel distance so that a distance between a heel of the swing leg and a vertical surface of a previous step minus the ankle-to-heel distance is greater than or equal to 0, wherein the ankle-to-heel distance is a horizontal distance between an ankle joint of the swing leg of the robot and the heel of the swing leg of the robot;

determining an initial state and an end state of the swing leg in each of the planned stages according to the start position; and obtaining a planned trajectory of the swing leg by performing a curve fitting according to the initial state and the end state.

11. The robot of claim 10, wherein the adjusting the start position of the swing leg of the robot according to the ankle-to-heel distance comprises:

adjusting the start position so that a horizontal distance between the ankle joint of the swing leg and a vertical surface of a present step minus the ankle-to-heel distance is greater than or equal to 0.

12. The robot of claim 10, wherein the determining the initial state and the end state of the swing leg in each of the planned stages according to the start position comprises:

determining the initial state and the end state of the swing leg in each of the planned stages in an x direction and a z direction according to the start position, wherein the x direction is a forward direction of the robot, and the z direction is an upward direction of the robot.

13. The robot of claim 12, wherein the determining the initial state and the end state of the swing leg in each of the planned stages according to the start position comprises:

in a first stage of the x direction, setting an initial position in the initial state to 0, setting an initial speed in the initial state to 0, setting an ending position in the end state to 0, and setting an ending speed in the end state to 0;

in a second stage of the x direction, setting the initial position to 0, setting the initial speed to 0, setting the end position to lx, and setting the end speed to a preset first speed, wherein lx is a horizontal distance between the heel of the swing leg and a vertical surface of a present step;

in a third stage of the x direction, setting the initial position to lx, setting the initial speed to the preset first speed, setting the end position to 1, and setting the end speed to 0, wherein l is a step length of the robot;

in a fourth stage of the x direction, setting the initial position to 1, setting the initial speed to 0, setting the end position to 1, and setting the end speed to 0;

in a first stage of the z direction, setting the initial position to h, setting the initial speed to 0, setting the end position to h+Δh$_1$, and setting the end speed to 0, wherein h is a step height, Δh$_1$ is a preset first height and Δh$_1$>0;

in a second stage of the z direction, setting the initial position to h+Δh$_1$, setting the initial speed to 0, setting the end position to h+Δh$_2$, and setting the end speed to a preset second speed, wherein Δh$_2$ is a preset second height and Δh$_2$>0; and in a third stage of the z direction, setting the initial position to h+Δh$_2$, setting the initial speed to the preset second speed, setting the end position to 0, and setting the end speed to 0.

14. The robot of claim 12, wherein the determining the initial state and the end state of the swing leg in each of the planned stages according to the start position comprises:

in a first stage of the x direction, setting an initial position in the initial state to 0, setting an initial speed in the initial state to 0, setting an ending position in the end state to 0, and setting an ending speed in the end state to 0;

in a second stage of the x direction, setting the initial position to 0, setting the initial speed to 0, setting the end position to lx+Δx, and setting the end speed to a preset first speed, wherein lx is a horizontal distance between the heel of the swing leg and a vertical surface of a present step a vertical step surface, and Δx is a preset horizontal distance;

in a third stage of the x direction, setting the initial position to lx+Δx, setting the initial speed to the preset first speed, setting the end position to 1, and setting the end speed to 0, wherein 1 is a step length of the robot;

in a fourth stage of the x direction, setting the initial position to 1, setting the initial speed to 0, setting the end position to 1, and setting the end speed to 0;

in a first stage of the z direction, setting the initial position to h, setting the initial speed to 0, setting the end position to h+Δh$_1$, and setting the end speed to 0, wherein h is a step height, Δh$_1$ is a preset first height and Δh$_1$>0; and in a second stage of the z direction, setting the initial position to h+Δh$_1$, setting the initial speed to 0, setting the end position to 0, and setting the end speed to 0.

15. The robot of claim 10, further comprising:
determining the initial state and the end state of a centroid of the robot during the stepping down process; and
obtaining a planned trajectory of the centroid by performing a curve fitting according to the initial state and the end state.

16. The robot of claim 15, wherein the determining the initial state and the end state of the centroid of the robot during the stepping down process comprises:
in an x direction, setting an initial position to 0, setting an initial speed to 0, setting an end position to 0, and setting an end speed to 0, wherein the x direction is a forward direction of the robot; and
in a z direction, setting the initial position to h+H, setting the initial speed to 0, setting the end position to H, and setting the end speed to 0; wherein h is a step height, H is a preset height of the centroid, and the z direction is an upward direction of the robot.

17. The robot of claim 10, wherein the performing the curve fitting according to the initial state and the end state comprises:
performing the curve fitting according to an equation of:

$x(t)=f(x_b,x_f,v_b,v_f,t_b,t_f,t)=a_0+a_1(t-t_b)+a_2(t-t_b)^2+a_3(t-t_b)^3$;

where, $t_b$ is the initial time, $x_b$ is the initial position, $v_b$ is the initial speed, $t_f$ is the end time, $x_f$ is the end position, $v_f$ is the end speed, t is the time, $f$ is a cubic polynomial function, x(t) is the planned trajectory curve in the x direction, and $a_0$, $a_1$, $a_2$, and $a_3$ are coefficients of a cubic polynomial.

18. The robot of claim 17, wherein each of the coefficients of the cubic polynomial are set by:
calculating the coefficients of the cubic polynomial according to equations of:

$$a_0 = x_b;$$

$$a_1 = v_f;$$

$$a_2 = \frac{3}{(t_f-t_b)^2}(x_f-x_b) - \frac{1}{(t_f-t_b)^2}(2v_b+v_f); \text{ and}$$

$$a_3 = -\frac{2}{(t_f-t_b)^3}(x_f-x_b) + \frac{1}{(t_f-t_b)^2}(v_b+v_f).$$

19. A non-transitory computer readable storage medium for storing one or more computer programs, wherein the one or more computer programs comprise:
instructions for dividing a stepping down process of a robot into a plurality of planned stages;
instructions for adjusting a start position of a swing leg of the robot according to an ankle-to-heel distance so that a distance between a heel of the swing leg and a vertical surface of a previous step is not less than minus the ankle-to-heel distance is greater than or equal to 0, wherein the ankle-to-heel distance is a horizontal distance between an ankle joint of the swing leg of the robot and the heel of the swing leg of the robot;
instructions for determining an initial state and an end state of the swing leg in each of the planned stages according to the start position; and
instructions for obtaining a planned trajectory of the swing leg by performing a curve fitting according to the initial state and the end state, and controlling the robot to walk according to the planned trajectory of the swing leg.

20. The storage medium of claim 19, wherein the instructions for determining the initial state and the end state of the swing leg in each of the planned stages according to the start position comprise:
instructions for determining the initial state and the end state of the swing leg in each of the planned stages in an x direction and a z direction according to the start position, wherein the x direction is a forward direction of the robot, and the z direction is an upward direction of the robot.

* * * * *